United States Patent
Han et al.

(10) Patent No.: US 12,170,586 B2
(45) Date of Patent: Dec. 17, 2024

(54) PULSE-AMPLITUDE MODULATION TRANSMITTER AND RECEIVER AND METHOD OF LIMITING TRANSITION LEVEL THEREOF

(71) Applicant: IUCF-HYU (INDUSTRY-UNIVERSITY COOPERATION FOUNDATION HANYANG UNIVERSITY), Seoul (KR)

(72) Inventors: Jaeduk Han, Seoul (KR); Eunji Song, Seoul (KR); Seonghyun Park, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 71 days.

(21) Appl. No.: 18/302,392

(22) Filed: Apr. 18, 2023

(65) Prior Publication Data

US 2023/0344686 A1    Oct. 26, 2023

(30) Foreign Application Priority Data

Apr. 20, 2022  (KR) .......... 10-2022-0048694
Mar. 31, 2023  (KR) .......... 10-2023-0043086

(51) Int. Cl.
*H04L 27/04*   (2006.01)

(52) U.S. Cl.
CPC .................. *H04L 27/04* (2013.01)

(58) Field of Classification Search
CPC . H04L 25/4917; H04L 1/0071; H04L 1/0057; H04L 1/0041; H04L 25/03057;
(Continued)

(56) References Cited

U.S. PATENT DOCUMENTS 7,876,866 B1     1/2011   McAdam et al.
9,531,572 B1 *  12/2016   Shim ................ H04L 7/0012
(Continued)

FOREIGN PATENT DOCUMENTS

KR   10-2006-0089553 A   8/2006
KR   10-2022-0030001 A   3/2022
(Continued)

OTHER PUBLICATIONS

Eunji Song, et al., :"Transition-limited pulse-amplitude modulation technique for high-speed wireline communication systems", ETRI Journal WILEY, 2022, pp. 1-8.
(Continued)

*Primary Examiner* — Eva Y Puente
(74) *Attorney, Agent, or Firm* — Sughrue Mion, PLLC

(57) ABSTRACT

A pulse-amplitude modulation (PAM) transmitter includes a transceiver, and at least one processor connected to the transceiver and configured to identify, from among symbols included in an input signal, a symbol that exceeds a specified transition level, when the symbol exceeding the transition level is identified, obtain a frame buffer including at least one bit among bits constituting the identified symbol, encode input data by inverting at least one bit among the bits constituting the identified symbol, and transmit the frame buffer and the encoded input data.

20 Claims, 12 Drawing Sheets

(58) Field of Classification Search
CPC ..... H04L 1/0045; H04L 27/34; H04L 1/0003; H04L 1/0058; H04L 25/03343; H04L 25/03885; H04L 27/38; H04L 27/02; H04B 10/541; H04B 10/40; H04B 10/116; H04B 10/524; H04B 7/0413; H04B 10/516; H04B 7/0456; H04B 10/5161; H04B 3/32; H04B 10/60; H04B 3/54; H04B 3/52; H04B 14/023; H04J 14/02; H04J 11/00; H04J 14/06; H04J 14/0307; H04J 14/0227; H04J 14/0282; H04J 14/0221; H04J 14/0305
USPC .......................................................... 375/300
See application file for complete search history.

(56) References Cited

U.S. PATENT DOCUMENTS

| | | | | |
|---|---|---|---|---|
| 10,142,089 | B2* | 11/2018 | Yao | H03L 7/0807 |
| 10,205,525 | B1* | 2/2019 | Cevrero | H04B 10/50593 |
| 2006/0176988 | A1 | 8/2006 | Sohn et al. | |
| 2010/0329381 | A1* | 12/2010 | Shimizu | H04L 7/0008 |
| | | | | 375/293 |
| 2016/0006587 | A1 | 1/2016 | Hollis | |
| 2017/0359211 | A1* | 12/2017 | Dickson | H04L 27/364 |
| 2019/0305851 | A1* | 10/2019 | Vegas-Olmos | H04B 10/541 |
| 2020/0242062 | A1* | 7/2020 | Lee | G06F 13/4282 |
| 2021/0075651 | A1 | 3/2021 | Stojanovic et al. | |
| 2022/0045887 | A1* | 2/2022 | Prabhakar | H04L 12/403 |
| 2022/0068359 | A1 | 3/2022 | Shin et al. | |
| 2022/0294476 | A1 | 9/2022 | Seol et al. | |

FOREIGN PATENT DOCUMENTS

| | | |
|---|---|---|
| KR | 10-2022-0127129 A | 9/2022 |
| WO | 2016/007221 A1 | 1/2016 |

OTHER PUBLICATIONS

Extended European Search Report issued Sep. 1, 2023 in Application No. 23167959.8.

* cited by examiner

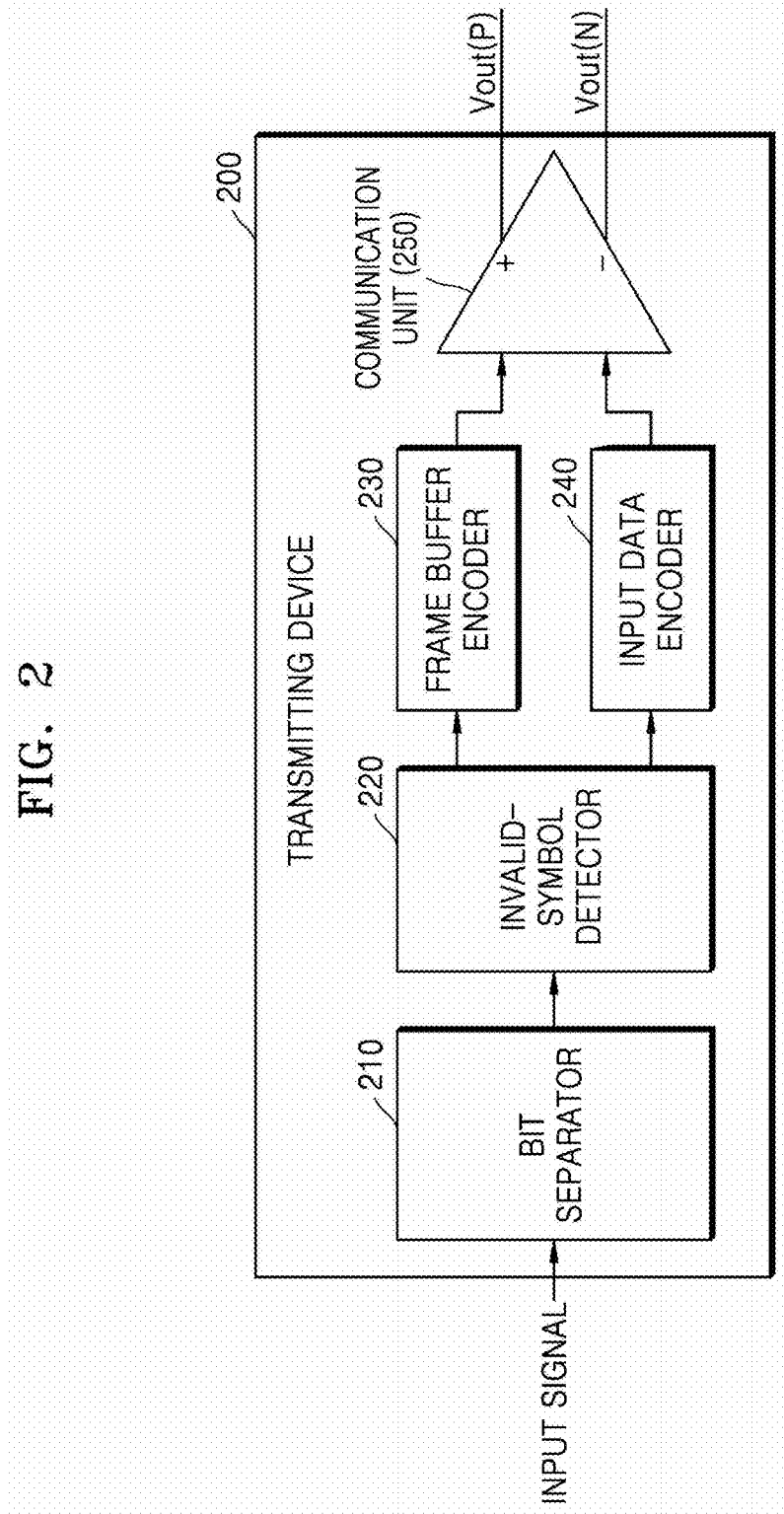

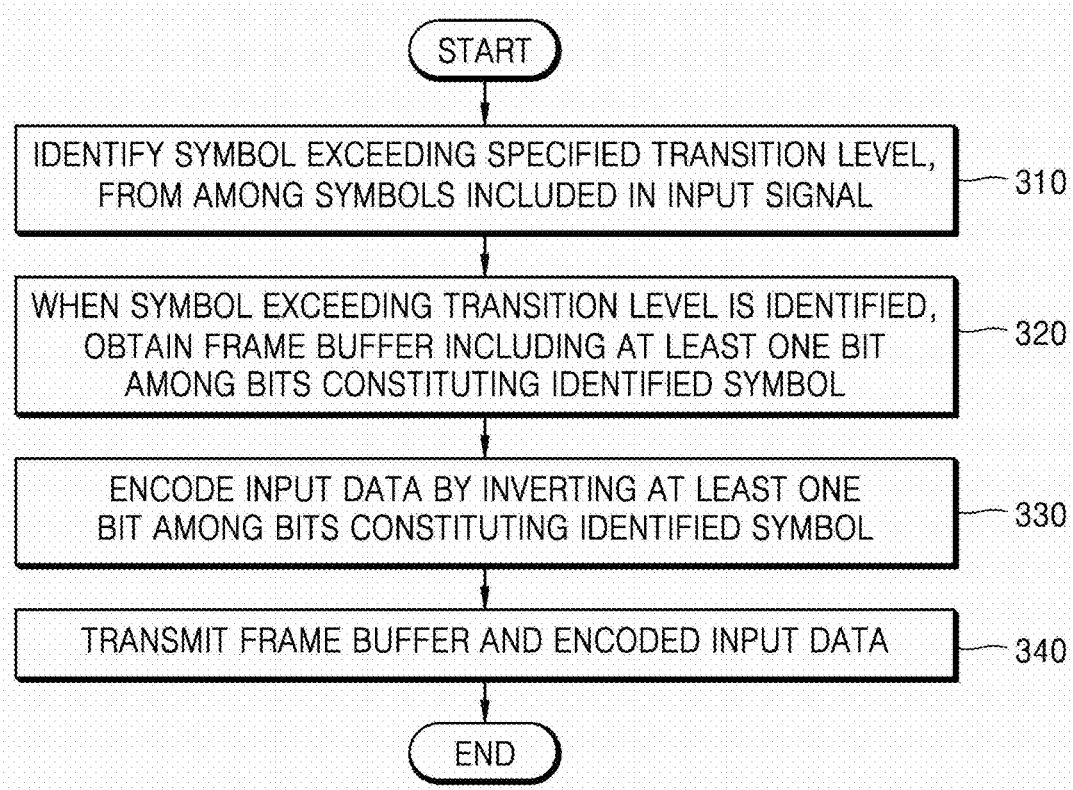

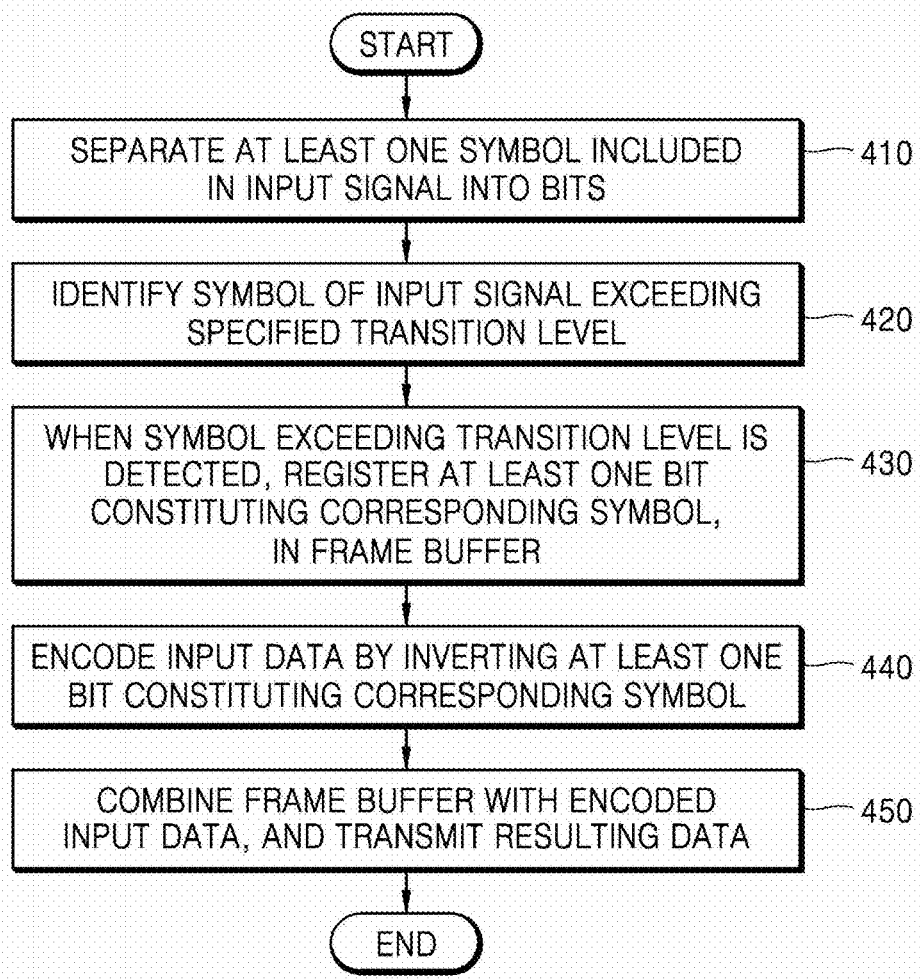

FIG. 6B

PULSE-AMPLITUDE MODULATION TRANSMITTER AND RECEIVER AND METHOD OF LIMITING TRANSITION LEVEL THEREOF

CROSS-REFERENCE TO RELATED APPLICATION

This application is based on and claims priority under 35 U.S.C. § 119 to Korean Patent Application No. 10-2022-0048694, filed on Apr. 20, 2022, in the Korean Intellectual Property Office, and Korean Patent Application No. 10-2023-0043086, filed on Mar. 31, 2023, in the Korean Intellectual Property Office, the disclosure of which is incorporated by reference herein in its entirety.

BACKGROUND

1. Field

The disclosure relates to a pulse-amplitude modulation transmitter and receiver, and a method of limiting a transition level thereof, and more particularly, to a technology for increasing reliability at a receiving end by limiting a transition level when transmitting data. This work was supported by the Samsung Science & Technology Foundation [SRFC-IT2001-02].

2. Description of the Related Art

As the processing capability of digital computing engines has been improved and technology using interconnected networks has been developed, ultra-high-speed, high-capacity data transmission technology is required, and to this end, a high-speed serial link circuit structure is being used.

In order to increase the data rate of a communication system under the condition of a finite channel bandwidth, 4-level pulse-amplitude modulation (PAM-4) methods of transmitting 2 bits of data per symbol by using four voltage levels are emerging, instead of a conventional method of transmitting 1 bit per symbol, which is called non-return-to-zero (NRZ).

In addition, with the continuous development of computing technology, wired communication circuits and systems that achieve higher data rates are required, and higher-level PAM schemes such as PAM-8 and PAM-16 are expected to be used in the future.

In a general PAM system, due to the existence of various signal levels, the size of intersymbol interference (ISI) caused by channel loss is greater than that of the existing NRZ system. ISI refers to a phenomenon in which a pulse spreads and affects adjacent symbols when the channel bandwidth is less than the signal bandwidth, and when ISI occurs during signal transmission and reception, the quality of a signal is degraded.

Therefore, when the signal modulation level is excessively increased to increase the data transmission rate, the effect of ISI becomes significantly large, resulting in reduction of the eye-opening of the signal and an increase of the bit-error ratio (BER), and accordingly, it is difficult to establish a practical communication system.

Recently, a technology of preventing full transition (e.g., 11→00 or 00→11 in PAM-4) by using a mapping table has emerged to solve the above issue, however, in a method using such a mapping table according to the related art, the data rate is decreased and the limit level is determined according to a predetermined digital circuit, and thus, there is still an issue that the limit level may be adaptively changed in various ways.

SUMMARY

Provided are a pulse-amplitude modulation transmitter and receiver with a limited transition level and a high data rate, and a method of limiting a transition level thereof.

Provided are a pulse-amplitude modulation transmitter and receiver capable of adaptively limiting a level through encoding without using a separate digital circuit.

Additional aspects will be set forth in part in the description which follows and, in part, will be apparent from the description, or may be learned by practice of the presented embodiments of the disclosure.

According to an aspect of the disclosure, a pulse-amplitude modulation (PAM) transmitter includes a transceiver, and at least one processor connected to the transceiver and configured to identify, from among symbols included in an input signal, a symbol that exceeds a specified transition level, when the symbol exceeding the transition level is identified, obtain a frame buffer including at least one bit among bits constituting the identified symbol, encode input data by inverting at least one bit among the bits constituting the identified symbol, and transmit the frame buffer and the encoded input data.

In the PAM transmitter according to an embodiment, the at least one bit among the bits constituting the identified symbol may be a most significant bit (MSB).

In the PAM transmitter according to an embodiment, the at least one processor may be further configured to identify whether an i-th symbol among the symbols included in the input signal exceeds the transition level by comparing an (i−1)-th symbol with the i-th symbol.

In the PAM transmitter according to an embodiment, the at least one processor may be further configured to, after comparing the (i−1)-th symbol with the i-th symbol, obtain a symbol in which an MSB of the i-th symbol is inverted, and identify a difference between the symbol in which the MSB is inverted and the (i−1)-th symbol.

In the PAM transmitter according to an embodiment, the at least one processor may be further configured to, until a transition level of a symbol generated by combining a first bit included in the frame buffer with a bit of a symbol of the input signal corresponding to the first bit included in the frame buffer does not exceed the specified transition level, fill the frame buffer with a dummy bit having a value equal to the bit included in the frame buffer.

In the PAM transmitter according to an embodiment, the at least one processor may be further configured to, when a symbol exceeding the transition level is detected based on a result of inverting the MSB of the i-th symbol, encode the input data without inverting the at least one bit.

According to another aspect of the disclosure, a PAM receiver includes a transceiver, and at least one processor connected to the transceiver and configured to receive a frame buffer and encoded input data, identify, from among symbols included in the encoded input data, a symbol exceeding a specified transition level, and when the symbol exceeding the specified transition level is identified, restore the identified symbol by inverting at least one bit among bits constituting the identified symbol based on a bit included in the frame buffer.

In the PAM receiver according to an embodiment, the at least one bit among the bits constituting the identified symbol may be an MSB.

In the PAM receiver according to an embodiment, the at least one processor may be further configured to identify whether an i-th symbol among the symbols exceeds the transition level by comparing an (i−1)-th symbol with the i-th symbol.

In the PAM receiver according to an embodiment, the at least one processor may be further configured to, after comparing the (i−1)-th symbol with the i-th symbol, obtain a symbol in which an MSB of the i-th symbol is inverted, and identify a difference between the symbol in which the MSB is inverted and the (i−1)-th symbol.

According to another aspect of the disclosure, a method of limiting a transition level and transmitting PAM data includes identifying, from among symbols included in an input signal, a symbol that exceeds a specified transition level, when the symbol exceeding the transition level is identified, obtaining a frame buffer including at least one bit among bits constituting the identified symbol, encoding input data by inverting at least one bit among the bits constituting the identified symbol, and transmitting the frame buffer and the encoded input data.

In the method of limiting a transition level and transmitting PAM data according to an embodiment, the at least one bit among the bits constituting the identified symbol may be an MSB.

In the method of limiting a transition level and transmitting PAM data according to an embodiment, the identifying of the symbol exceeding the specified transition level may include identifying whether an i-th symbol among the symbols included in the input signal exceeds the transition level by comparing an (i−1)-th symbol with the i-th symbol.

In the method of limiting a transition level and transmitting PAM data according to an embodiment, the encoding of the input data may include after comparing the (i−1)-th symbol with the i-th symbol, obtaining a symbol in which an MSB of the i-th symbol is inverted, and identifying a difference between the symbol in which the MSB is inverted and the (i−1)-th symbol.

In the method of limiting a transition level and transmitting PAM data according to an embodiment, the obtaining of the frame buffer may include, until a transition level of a symbol generated by combining a first bit included in the frame buffer with a bit of a symbol of the input signal corresponding to the first bit included in the frame buffer does not exceed the specified transition level, filling the frame buffer with a dummy bit having a value equal to the bit included in the frame buffer.

In the method of limiting a transition level and transmitting PAM data according to an embodiment, the encoding of the input data may include, when a symbol exceeding the transition level is detected based on a result of inverting the MSB of the i-th symbol, encoding the input data without inverting the at least one bit.

According to another aspect of the disclosure, a method of limiting a transition level and receiving PAM data includes receiving a frame buffer and encoded input data, identifying, from among symbols included in the encoded input data, a symbol exceeding a specified transition level, and when the symbol exceeding the specified transition level is identified, restoring the identified symbol by inverting at least one bit among bits constituting the identified symbol based on a bit included in the frame buffer.

In the method of limiting a transition level and receiving PAM data according to an embodiment, the at least one bit among the bits constituting the identified symbol is an MSB.

In the method of limiting a transition level and receiving PAM data according to an embodiment, the identifying of the symbol exceeding the specified transition level may include identifying whether an i-th symbol among the symbols exceeds the transition level by comparing an (i−1)-th symbol with the i-th symbol.

In the method of limiting a transition level and receiving PAM data according to an embodiment, the restoring of the identified symbol may include, after comparing the (i−1)-th symbol with the i-th symbol, obtaining a symbol in which an MSB of the i-th symbol is inverted, and identifying a difference between the symbol in which the MSB is inverted and the (i−1)-th symbol.

BRIEF DESCRIPTION OF THE DRAWINGS

The above and other aspects, features, and advantages of certain embodiments of the disclosure will be more apparent from the following description taken in conjunction with the accompanying drawings, in which:

In order to more fully understand the drawings referenced herein, a brief description of each drawing is provided.

FIG. 2 is a block diagram illustrating a transmitting device according to an embodiment;

FIG. 3 is a flowchart illustrating a method, performed by a transmitting device, of limiting a transition level and transmitting data, according to an embodiment;

FIG. 4 is a flowchart for describing in more detail a method, performed by a transmitting device, of limiting a transition level and transmitting data, according to an embodiment;

FIGS. 6A and 6B are diagrams illustrating a method of limiting a transition level by using a PAM-8 data block, according to an embodiment;

DETAILED DESCRIPTION

Figure 1:
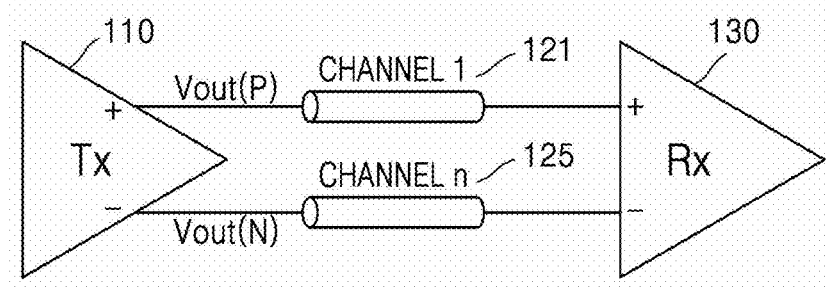
FIG. 1 is a conceptual diagram of a high-speed interconnect system according to various embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described with reference to the accompanying drawings. In the drawings, the same elements are assigned the same reference numerals although they are shown in different drawings. In addition, in describing the embodiments, a detailed description of known functions and configurations incorporated herein will be omitted when it is determined that the description may make the embodiments rather unclear. In addition, the embodiments will be described below, but the technical spirit of the disclosure is not limited thereto and may be modified and implemented in various ways by those skilled in the art.

In addition, terms used herein are for describing the embodiments and are not intended to limit the scope of the disclosure. A singular expression may include a plural expression unless they are definitely different in a context.

As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

In addition, throughout the present specification, when a part is referred to as being "connected to" another part, it may be "directly connected to" the other part or be "indirectly connected to" the other part through an intervening element, and although terms such as "first" or "second" may be used herein to describe various elements, these elements are not limited by these terms.

As used herein, the expression "configured to" may be interchangeably used with, for example, "suitable for", "having the capacity to", "designed to", "adapted to", "made to", or "capable of", according to a situation. The expression "configured to" may not imply only "specially designed to" in a hardware manner. Instead, in a certain circumstance, the expression "a system configured to" may indicate the system "capable of" together with another device or components. For example, "a processor configured (or set) to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory.

It may be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment may generate a means configured to perform functions described in flowchart block(s). These computer program instructions may also be stored in a computer-usable or computer-readable memory capable of orienting a computer or other programmable data processing equipment to implement a function in a particular mode, and thus, the instructions stored in the computer-usable or computer-readable memory may also produce a production item involving an instruction means configured to perform a function described in flowchart block(s). The computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in several substitutional embodiments, functions described in blocks may also be out of a sequence. For example, two consecutively shown blocks may be substantially performed at the same time in fact, or the blocks may be sometimes performed in a reverse order according to a corresponding function.

Hereinafter, embodiments will be described in detail with reference to the accompanying drawings to allow those of skill in the art to easily carry out the embodiments. In addition, in order to clearly describe the embodiments with reference to the drawings, parts irrelevant to the description will be omitted.

FIG. 1 is a conceptual diagram of a high-speed interconnect system 100 according to various embodiments.

Referring to FIG. 1, the typical high-speed interconnect system 100 may include a transmitter 110, at least one channel (e.g., 121), and a receiver 130.

According to various embodiments, the at least one channel (e.g., 121) includes a coaxial cable, a backplane, a printed circuit board (PCB), a package, or on-chip wires, and the length of the at least one channel (e.g., 121) may range from several centimeters to several tens of meters.

When the data rate is in the range of several Gb/s to several tens of Gb/s, the at least one channel (e.g., 121) has the characteristics of a low-pass filter (LPF). Accordingly, when a signal passes through the at least one channel (e.g., 121), intersymbol interference (ISI) may occur.

In a case in which the signal loss due to the channel at the Nyquist frequency is large, the ISI seriously hinders communication. For example, it is known that the ISI is relatively small when the signal loss is 0 dB to 10 dB, the ISI is large, the ISI is large when the signal loss is 10 dB to 20 dB, and the ISI is significantly large when the signal loss is 20 dB to 30 dB.

Meanwhile, in a case in which a pulse-amplitude modulation (PAM)-applied signal is transmitted or received to increase the data rate in the high-speed interconnect system 100, ISI caused by a channel may cause serious performance degradation due to the presence of various signal levels. Embodiments described herein provide a method of limiting a transition level of a signal in order to prevent deterioration of signal quality due to ISI, while increasing the data rate.

FIG. 2 is a block diagram illustrating a transmitting device 200 according to an embodiment.

Referring to FIG. 2, the transmitting device 200 may include a bit separator 210, an invalid-symbol detector 220, a frame buffer encoder 230, an input data encoder 240, and a communication unit 250. Here, the bit separator 210, the invalid-symbol detector 220, the frame buffer encoder 230, the input data encoder 240, and the communication unit 250 may be modules included in respective programs to be executed by different processors or one processor. According to various embodiments, each component may be omitted or modified. The transmitting device 200 may correspond to the transmitter 110 in the high-speed interconnect system 100 described above with reference to FIG. 1.

In addition, in FIG. 2, the frame buffer encoder 230 and the input data encoder 240 may be configured in one processor. In this case, the processor may combine bits encoded by the frame buffer encoder 230 and the input data encoder 240 with each other, and transmit the combined bits to the communication unit 250.

The bit separator 210 according to an embodiment may separate symbols included in an input signal into a first bit, a second bit, and an n-th bit sequentially from the highest level, based on a specified criterion.

In detail, the bit separator 210 may separate the first bit as a most significant bit (MSB), and separate the second bit and the n-th bit as a first least significant bit (LSB) and an n−1st LSB, respectively.

For example, in a case in which an output signal is a PAM-4 signal matching two bits to one symbol as shown in Table 1, the bit separator 210 may group the bits included in the input signal into groups each including two bits. Then, the bit separator 210 may separate the first bit of the two bits in each group as an MSB, and separate the second bit as an LSB.

TABLE 1

| PAM-4 symbol | MSB | LSB |
| --- | --- | --- |
| 3 | 1 | 1 |
| 2 | 1 | 0 |
| 1 | 0 | 1 |
| 0 | 0 | 0 |

For example, in a case in which an output signal is a PAM-8 signal matching three bits to one symbol as shown in Table 2, the bit separator 210 may group the bits included in the input signal into groups each including three bits. In addition, the bit separator 210 may separate the first bit of the three bits as an MSB, the second bit as a first LSB, and the third bit as a second LSB.

TABLE 2

| PAM-8 symbol | MSB | First LSB | Second LSB |
| --- | --- | --- | --- |
| 7 | 1 | 1 | 1 |
| 6 | 1 | 1 | 0 |
| 5 | 1 | 0 | 1 |
| 4 | 1 | 0 | 0 |
| 3 | 0 | 1 | 1 |
| 2 | 0 | 1 | 0 |
| 1 | 0 | 0 | 1 |
| 0 | 0 | 0 | 0 |

In addition, the invalid-symbol detector 220 may identify, for example, a symbol of an input signal exceeding a specified transition level. The transition level may be specified by a user or a system, based on the state of a channel or system requirements.

For example, in PAM-4, the transition level may be specified as a value of 3 or less, and in PAM-8, the transition level may be specified as a value of 7 or less. Hereinafter, an example will be described in which the transition level is specified as 2 in PAM-4 and the transition level is specified as 5 in PAM-8.

In addition, the invalid-symbol detector 220 may sequentially compare an (i−1)-th symbol with an i-th symbol, and check whether the i-th symbol exceeds the transition level. For example, when the difference between the (i−1)-th symbol and the i-th symbol in PAM-4 is '3', the invalid-symbol detector 220 may determine that the i-th symbol exceeds the specified transition level ('2'). As another example, when the difference between the (i−1)-th symbol and the i-th symbol in PAM-8 is '6' or '7', the invalid-symbol detector 220 may determines that the i-th symbol exceeds the specified transition level ('5').

After comparing the (i−1)-th symbol with the i-th symbol, the invalid-symbol detector 220 may invert the MSB of the i-th symbol and again compare the i-th symbol with the (i−1)-th symbol. For example, in PAM-4, when the (i−1)-th symbol is '0' and the i-th symbol is '1', the invalid-symbol detector 220 having determined that the transition level is not exceeded may invert the MSB of the i-th symbol. The value of the i-th symbol whose MSB is inverted may be '3', and the invalid-symbol detector 220 may determine that the inverted i-th symbol exceeds the specified transition level ('2').

The invalid-symbol detector 220 according to an embodiment may invert the MSB only when the i-th symbol exceeds the specified transition level as a result of comparing the (i−1)-th symbol with the i-th symbol. The invalid-symbol detector 220 may determine that the i-th symbol is not inverted, when a result of comparing the (i−1)-th symbol with the i-th symbol whose MSB is inverted also exceeds the transition level.

Meanwhile, the above-described embodiments are only examples, and the invalid-symbol detector 220 may invert at least one of bits other than the MSB according to settings, when the i-th symbol exceeds the specified transition level, as a result of comparing the (i−1)-th symbol with the i-th symbol.

When a symbol exceeding the transition level is detected, the frame buffer encoder 230 according to an embodiment may register at least one bit constituting the corresponding symbol, in a frame buffer.

For example, based on determining that the i-th symbol exceeds the specified transition level, the frame buffer encoder 230 may register the MSB of the i-th symbol, in the frame buffer.

For example, the frame buffer encoder 230 may register '0' in the frame buffer when the MSB of the i-th symbol exceeding the specified transition level is '0', and may register '1' in the buffer frame when the MSB of the i-th symbol exceeding the specified transition level is '1'.

In addition, the frame buffer encoder 230 may check whether a symbol obtained by combining a bit registered in the frame buffer with the LSB exceeds the specified transition level, and fill the frame buffer with a bit (i.e., a dummy bit) identical to the registered bit until the symbol obtained by combining the bit registered in the frame buffer with the LSB does not exceed the transition level. For example, the frame buffer encoder 230 having registered '1' in the first bit of the frame buffer may continuously register '1' until the transition level of the symbol obtained by combining the second bit, which is the bit next to the first bit, with the LSB corresponding to the second bit does not exceed the specified level.

The input data encoder 240 according to an embodiment may encode input data by inverting at least one bit constituting a corresponding symbol.

For example, based on determining that the i-th symbol exceeds the specified transition level, the input data encoder 240 may invert the MSB of the i-th symbol and then encode input data.

For example, when the MSB of the i-th symbol exceeding the specified transition level is '0', the input data encoder 240 may invert the MSB to '1', and when the MSB of the i-th symbol exceeding the specified transition level is '1', the input data encoder 240 may invert the MSB to '0'.

For example, when the invalid-symbol detector 220 determines again that the inverted symbol exceeds the transition level, the input data encoder 240 does not invert at least one bit constituting the corresponding symbol.

For example, when the invalid-symbol detector 220 having inverted the MSB of the i-th symbol determines that the i-th symbol exceeds the specified transition level, the input data encoder 240 encode the input data while maintaining the MSB of the i-th symbol.

The communication unit 250 according to an embodiment may combine the frame buffer encoded by the frame buffer encoder 230 with the input data encoded by the input data encoder 240, and transmit the resulting data to the receiver 130.

For example, the communication unit 250 may support establishment of a direct (e.g., wired) communication channel or a wireless communication channel between external electronic devices supporting PAM communication, and communication through the established communication channel.

FIG. 3 is a flowchart illustrating a method, performed by a transmitting device, of limiting a transition level and transmitting data, according to an embodiment.

Referring to FIG. 3, in operation 310, the transmitting device may identify a symbol exceeding a specified transition level, from among at least one symbol included in an input signal. The transmitting device may sequentially compare an (i–1)-th symbol with an i-th symbol included in the input signal, and based on a result of the comparing, identify whether the i-th symbol exceeds the specified transition level. For example, when the difference between a result of converting the (i–1)-th symbol into a decimal number and a result of converting the i-th symbol into a decimal number exceeds the specified transition level (e.g., 5), the transmitting device may identify the i-th symbol as a symbol exceeding the specified transition level.

In operation 320, based on identifying a symbol exceeding the transition level, the transmitting device may obtain a frame buffer including at least one bit among bits constituting the identified symbol. For example, based on determining that the i-th symbol exceeds the specified transition level, the transmitting device may register the MSB of the i-th symbol, in the frame buffer.

In operation 330, the transmitting device may encode input data by inverting at least one bit among the bits constituting the identified symbol. For example, based on determining that the i-th symbol exceeds the specified transition level, the transmitting device may encode a symbol obtained by inverting the MSB of the i-th symbol, as the input data.

In operation 340, the transmitting device may transmit the frame buffer and the encoded input data. For example, the transmitting device may combine the frame buffer with the encoded input data into one signal, and transmit the signal to a receiving device. However, this is only an example, and according to another example, the transmitting device may transmit the frame buffer and the encoded input data as separate signals, to the receiving device.

FIG. 4 is a flowchart for describing in more detail a method, performed by a transmitting device, of limiting a transition level and transmitting data, according to an embodiment.

Referring to FIG. 4, in operation 410, the transmitting device may separate at least one symbol included in an input signal into bits.

For example, the transmitting device may separate the symbols included in the input signal into a first bit, a second bit, and an n-th bit, sequentially from the highest level based on a predetermined criterion. For example, the transmitting device may separate the first bit as an MSB, and separate the second bit and the n-th bit as a first LSB and an n–1st LSB, respectively.

In operation 420, the transmitting device may identify a symbol exceeding a specified transition level, from among the at least one symbol. For example, the transmitting device may sequentially compare an (i–1)-th symbol with an i-th symbol, and check whether the i-th symbol exceeds the transition level. After comparing the (i–1)-th symbol with the i-th symbol, the transmitting device according to an embodiment may invert the MSB of the i-th symbol and again compare the i-th symbol with the (i–1)-th symbol.

In operation 430, based on identifying a symbol exceeding the transition level, the transmitting device may register at least one bit constituting the corresponding symbol, in a frame buffer.

For example, based on determining that the i-th symbol exceeds the specified transition level, the transmitting device may sequentially register the MSB of the i-th symbol, in the frame buffer. The transmitting device according to an embodiment may check whether the symbol combined with the LSB based on the frame buffer after the registering exceeds the specified transition level, and fill the frame buffer with a bit (i.e., a dummy bit) identical to the registered bit until the symbol does not exceed the transition level.

In operation 440, the transmitting device may encode input data by inverting at least one bit constituting the corresponding symbol.

For example, based on determining that the i-th symbol exceeds the specified transition level, the transmitting device may invert the MSB of the i-th symbol and then encode the input data.

In operation 450, the transmitting device may combine the frame buffer with the encoded input data, and transmit the resulting data to a receiving device.

Figure 5A:
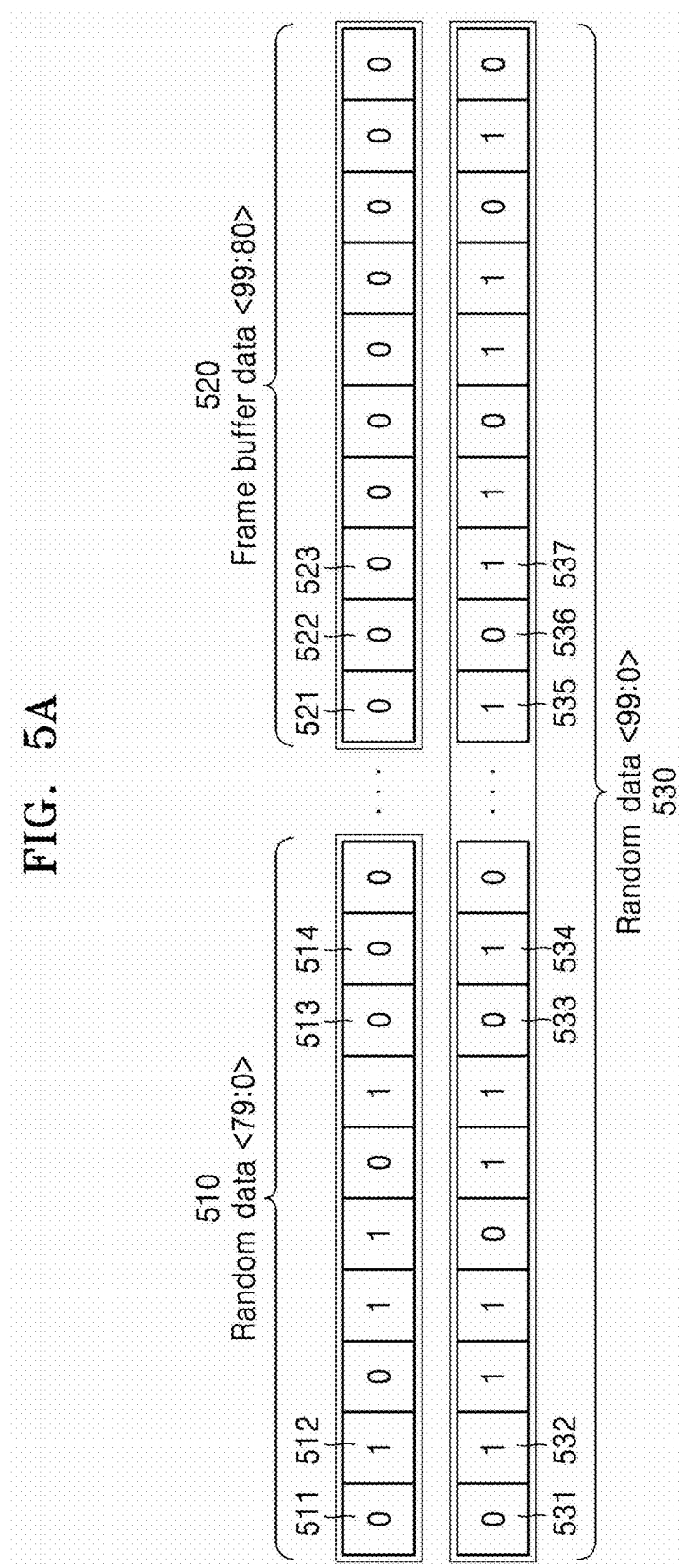
FIGS. 5A and 5B are diagrams illustrating a method of limiting a transition level by using a 4-level pulse amplitude modulation (PAM-4) data block, according to an embodiment.
Figure 5B:
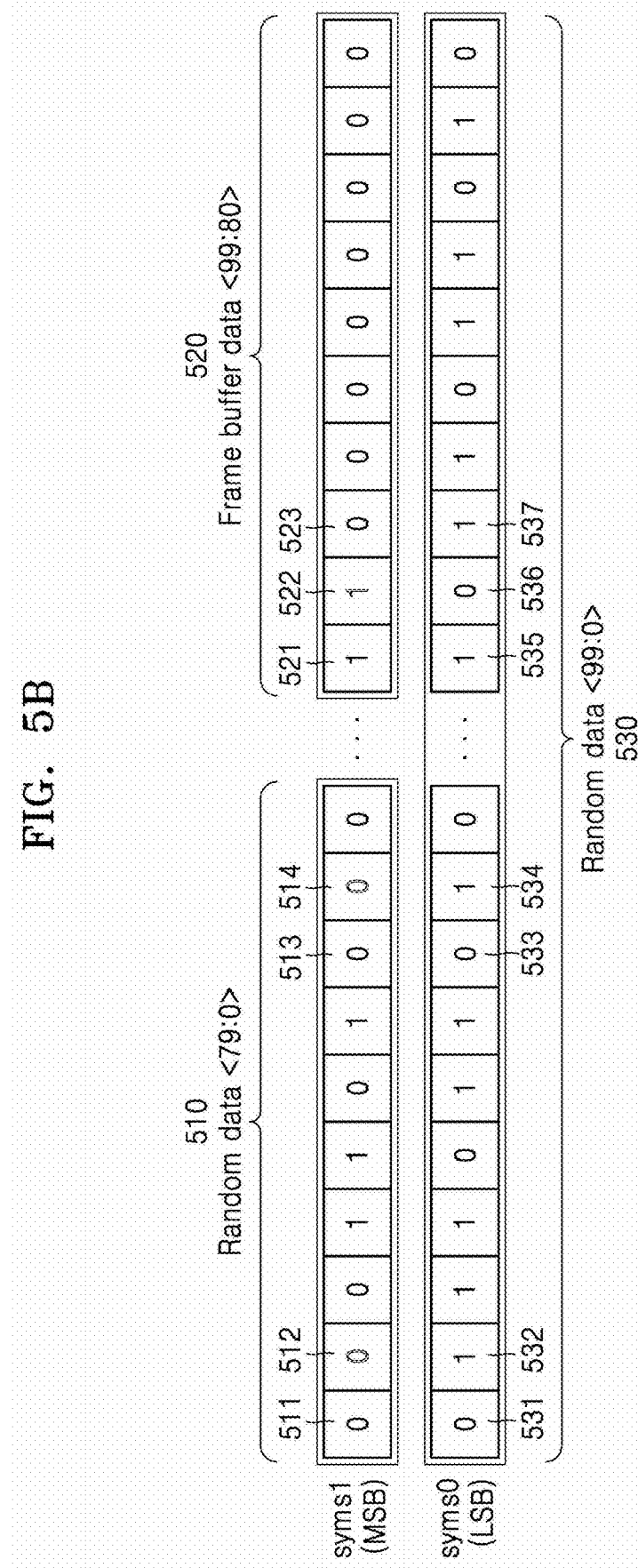

FIGS. 5A and 5B are diagrams illustrating a method of limiting a transition level by using a PAM-4 data block, according to an embodiment.

FIG. 5A illustrates an example of generating a data block by dividing symbols of an input signal into bits. In a case of a PAM-4 signal, a transmitting device may group bits included in the input signal into groups each including two bits. Then, the transmitting device may separate the first bit of the two bits in each group as an MSB, and separate the second bit as an LSB.

The PAM-4 data block according to an embodiment may include input data and frame buffer data. For example, the frame buffer data may be written by allocating a part of a data block constituting the MSB, to a frame buffer data block 520. According to an embodiment, the length of the frame buffer data block 520 may be flexibly changed, and the length of an MSB input data block 510 may be determined based on the length of the frame buffer data block 520.

FIGS. 5A and 5B illustrate a PAM-4 data block having a total length of 100. In a case in which the length of the frame buffer data block 520 is set to 20, the length of the MSB input data block 510 may be determined to be 80. In this case, because an LSB input data block 530 is not affected by the frame buffer data block 520, the entire length of 100 may be used to allocate input data.

A transmitting device according to an embodiment may identify a symbol of an input signal exceeding a specified transition level. For example, the transmitting device may sequentially compare an (i–1)-th symbol with an i-th symbol, and check whether the i-th symbol exceeds the transition level.

Referring to FIG. 5A, it may be seen that the first symbol has a value of '0' by combining a bit 511 with a bit 531. The second symbol has a symbol of '3' by combining a bit 512 with a bit 532, and the transmitting device may identify that the second symbol exceeds the specified transition level ('2'), by comparing the second symbol with the first symbol.

As another example, it may be seen that a (k−1)-th symbol has a value of '0' by combining a bits 513 with a bit 533, and a k-th symbol has a value of '1' by combining a bit 514 with a bit 534. The transmitter 110 may determine again whether the specified transition level is exceeded, by inverting the bit 514, which is the MSB of the k-th symbol. In this case, by combining the inverted bit 514 with the bit 534, a value of '3' is obtained, and the transmitter 110 may determine that the k-th symbol exceeds the specified transition level ('2').

FIG. 5B illustrates an example of encoding the MSB input data block 510 and the frame buffer data block 520. For example, '1', which is an MSB 512 of the second symbol exceeding the specified transition level ('2'), may be registered in the frame buffer data block 520. FIG. 5B illustrates an example in which '1', which is the MSB 512 of the second symbol, is registered in a bit 521, which is the first bit of the frame buffer data block 520.

The transmitting device according to an embodiment may check whether the transition level of the frame buffer data block 520 is exceeded due to data registration. For example, the first symbol of the frame buffer data block 520 in which data is registered has a value of '3' by combining the bit 521 and a bit 535.

The second symbol in which no data is registered has a symbol of '0' by combining a bit 522 with a bit 536, and the transmitting device may determine that the second symbol exceeds the specified transition level ('2'), by comparing the second symbol with the first symbol.

In this case, the transmitting device may limit the transition level by registering '1', which is dummy data, in the second symbol of the frame buffer data block 520 as well.

The transmitting device may continuously check whether the transition level of the frame buffer data block 520 is exceeded due to data registration. For example, the second symbol of the frame buffer data block 520 in which the dummy data is registered has a value of '2' by combining the bit 522 and a bit 536.

The third symbol in which no data is registered has a symbol of '1' by combining a bit 523 with a bit 537, and satisfies the specified transition level. The transmitting device may invert the MSB of the third symbol, and determine again whether the transition level is exceeded.

For example, based on identifying that the second symbol has a value of '3' by combining the inverted bit 523 with a bit 537 and thus satisfies the specified transition level, the transmitting device stops registering the dummy data.

Thereafter, the transmitting device may encode the input data by inverting the MSB for which the data registration in the frame buffer data block 520 is completed. For example, the specified transition level may be satisfied by inverting ('1' to '0') the bit 512 for which the data registration in the first bit 521 of the frame buffer data block 520 is completed.

Sequentially, the transmitting device may register '0', which is an MSB 514 of the k-th symbol, in the third MSB 523 of the frame buffer data block 520. The transmitting device may check whether the transition level of the frame buffer data block 520 is exceeded due to data registration. However, because the k-th symbol already satisfies the specified transition level, the transmitting device does not invert the MSB 514 of the k-th symbol.

Figure 6A:
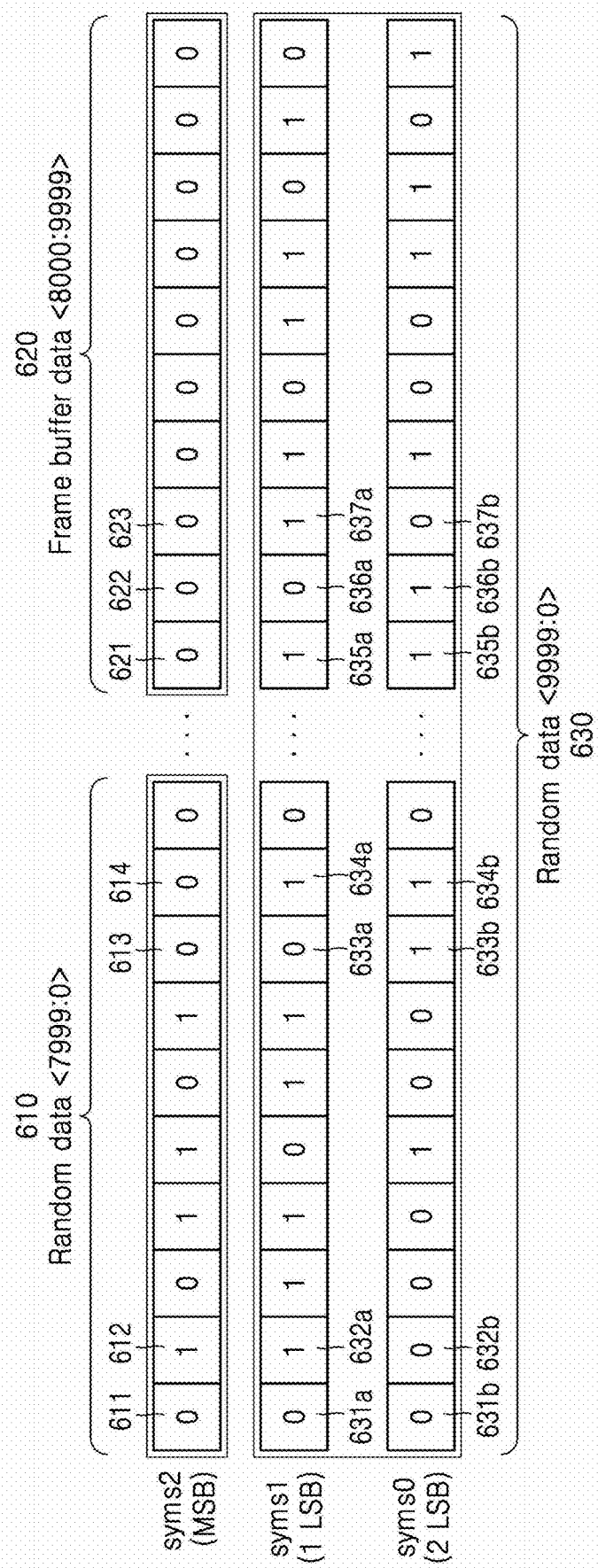
Figure 6B:
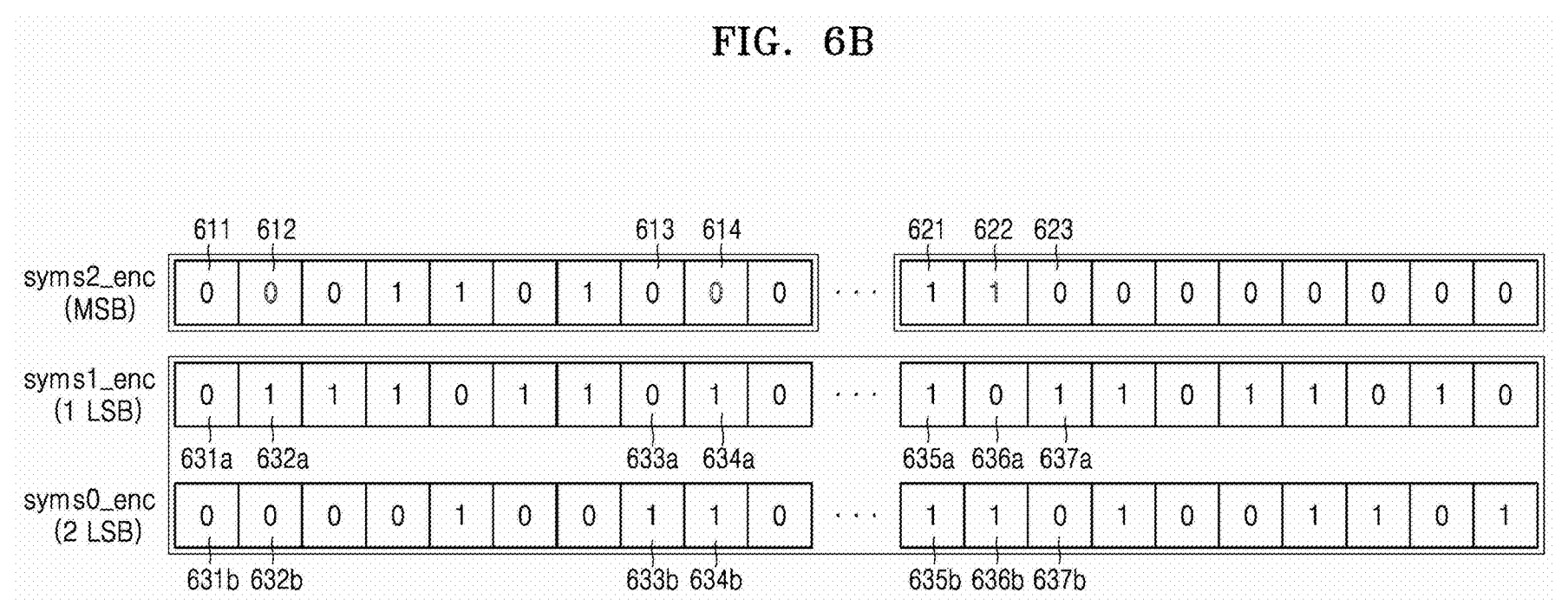

FIGS. 6A and 6B are diagrams illustrating a method of limiting a transition level by using a PAM-8 data block, according to an embodiment.

FIG. 6A illustrates an example of generating a data block by separating symbols of an input signal into bits. In a case of a PAM-8 signal, a transmitting device may group bits included in the input signal into groups each including three bits.

In addition, the transmitting device may separate the first bit of the three bits in each group as an MSB, the second bit as a first LSB, and the third bit as a second LSB.

The PAM-4 data block according to various embodiments may include input data and frame buffer data. For example, the frame buffer data may be written by allocating a part of a data block constituting the MSB, to a frame buffer data block 620. According to an embodiment, the length of the frame buffer data block 620 may be flexibly changed, and the length of an MSB input data block 610 may be determined based on the length of the frame buffer data block 620.

FIGS. 6A and 6B illustrate a PAM-8 data block having a total length of 10000. In a case in which the length of the frame buffer data block 620 is set to 2000, the length of the MSB input data block 610 may be determined to be 8000.

In this case, because first and second LSB input data blocks 630 are not affected by the frame buffer data block 620, the entire length of 10000 may be used to allocate input data.

The transmitting device according to various embodiments may identify a symbol of an input signal exceeding a specified transition level.

For example, the transmitting device may sequentially compare an (i−1)-th symbol with an i-th symbol, and check whether the i-th symbol exceeds the transition level. Referring to FIG. 6A, it may be seen that the first symbol has a value of '0' by combining a bit 611, a bit 631*a*, and a bit 631*b* with each other.

The second symbol has a symbol of '6' by combining a bit 612, a bit 632*a*, and a bit 632*b* with each other, and the transmitting device may determine that the second symbol exceeds the specified transition level ('5'), by comparing the second symbol with the first symbol.

As another example, a (k−1)-th symbol may have a value of '1' by combining a bit 613, a bit 633*a*, and a bit 633*b* with each other, and a k-th symbol may have a value of '3' by combining a bit 614, a bit 634*a*, and a bit 634*b* with each other. The transmitting device may determine again whether the specified transition level is exceeded, by inverting the bit 614, which is the MSB of the k-th symbol.

In this case, the k-th symbol has a value of '7' by combining the inverted bit 614, the bit 634*a*, and the bit 634*b* with each other, and the transmitting device may identify that the k-th symbol exceeds the specified transition level ('5').

FIG. 6B illustrates an example of encoding the MSB input data block 610 and the frame buffer data block 620.

For example, '1', which is an MSB 612 of the second symbol exceeding the specified transition level ('5'), may be registered in the frame buffer data block 620. FIG. 6B illustrates an example in which '1', which is the MSB 612 of the second symbol, is registered in a bit 621, which is the first bit of the frame buffer data block 620.

The transmitting device according to an embodiment may check whether the transition level of the frame buffer data block 620 is exceeded due to data registration. For example, the first symbol of the frame buffer data block 620 in which data is registered has a value of '7' by combining the bit 621, a bit 635a, and a bit 635b with each other.

The second symbol in which no data is registered has a symbol of '1' obtained by combining a bit 622, a bit 636a, and a bit 636b with each other, and the transmitting device may determine that the second symbol exceeds the specified transition level ('5'), by comparing the second symbol with the first symbol.

In this case, the transmitting device may limit the transition level by registering '1', which is dummy data, in the second symbol of the frame buffer data block 620 as well.

The transmitting device may continuously check whether the transition level of the frame buffer data block 620 is exceeded due to data registration.

For example, the second symbol of the frame buffer data block 620 in which the dummy data is registered has a value of '5' by combining the bit 622, the bit 636a, and the bit 636b with each other. The third symbol in which no data is registered has a symbol of '2' by combining a bit 623, a bit 637a, and a bit 637b with each other, and satisfies the specified transition level.

The transmitting device may invert the MSB of the third symbol, and determine again whether the transition level is exceeded based on the inverted MSB. For example, the transmitting device determines that the second symbol has a value of '6' by combining the inverted bit 623, the bit 637a, and the bit 637b with each other, and thus satisfies the specified transition level, and stops registering the dummy data.

Thereafter, the transmitting device may encode the input data by inverting the MSB for which the data registration in the frame buffer data block 620 is completed. For example, the specified transition level may be satisfied by inverting ('1' to '0') the bit 612 for which data registration in the bit 621 is completed.

Sequentially, the transmitting device may register '0', which is an MSB 614 of the k-th symbol, in a third MSB 623 of the frame buffer data block 620. The transmitting device may check whether the transition level of the frame buffer data block 620 is exceeded due to data registration. However, because the k-th symbol already satisfies the specified transition level, the transmitting device does not invert the MSB 614 of the k-th symbol.

Figure 7:
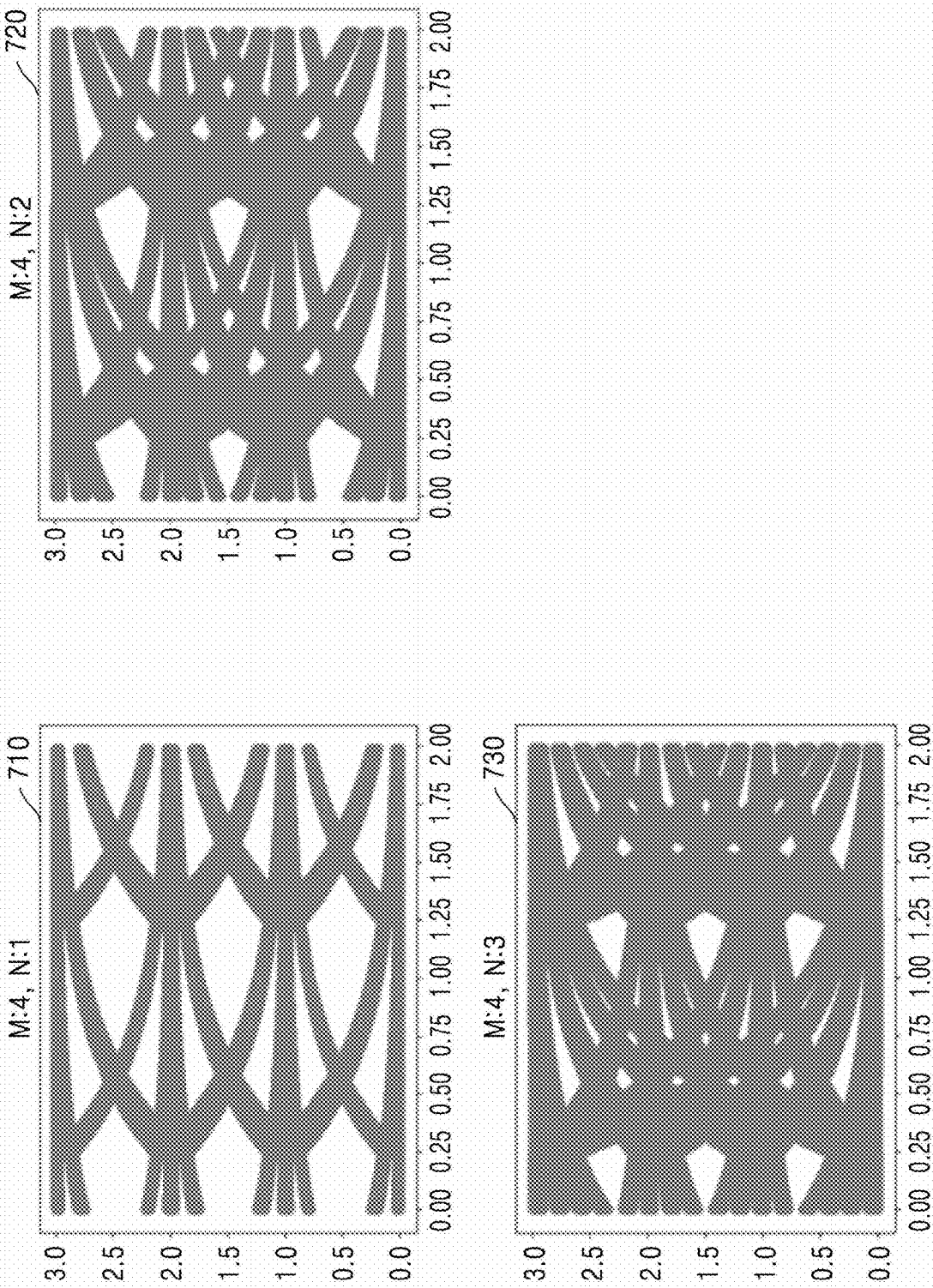
FIG. 7 is an eye-diagram in a case in which a transition level is limited in PAM-4 communication, according to an embodiment.

FIG. 7 is an eye-diagram in a case in which a transition level is limited in PAM-4 communication, according to an embodiment.

A first eye-diagram 710 of FIG. 7 shows a case in which a transition level limit is set to 1 in PAM-4 communication having a total of 4 levels. In a case in which the transition level limit is specified as 1 in PAM-4 communication, the bit error ratio becomes almost zero because the eye-opening is significantly large. However, in this case, the data rate may become significantly low.

A second eye-diagram 720 of FIG. 7 shows a case in which a transition level limit is set to 2 in PAM-4 communication having a total of 4 levels. In a case in which the transition level is limited to 2 in PAM-4 communication, a practical communication environment with relatively large eye-opening and significantly little bit error ratio may be provided.

A third eye-diagram 730 of FIG. 7 shows a case in which a transition level limit is set to 3 in PAM-4 communication having a total of 4 levels. Specifying the transition level limit as 3 in PAM-4 communication practically corresponds to a case in which there is substantially no transition level limit, and the bit error ratio may become significantly high depending on the channel environment.

Figure 8:
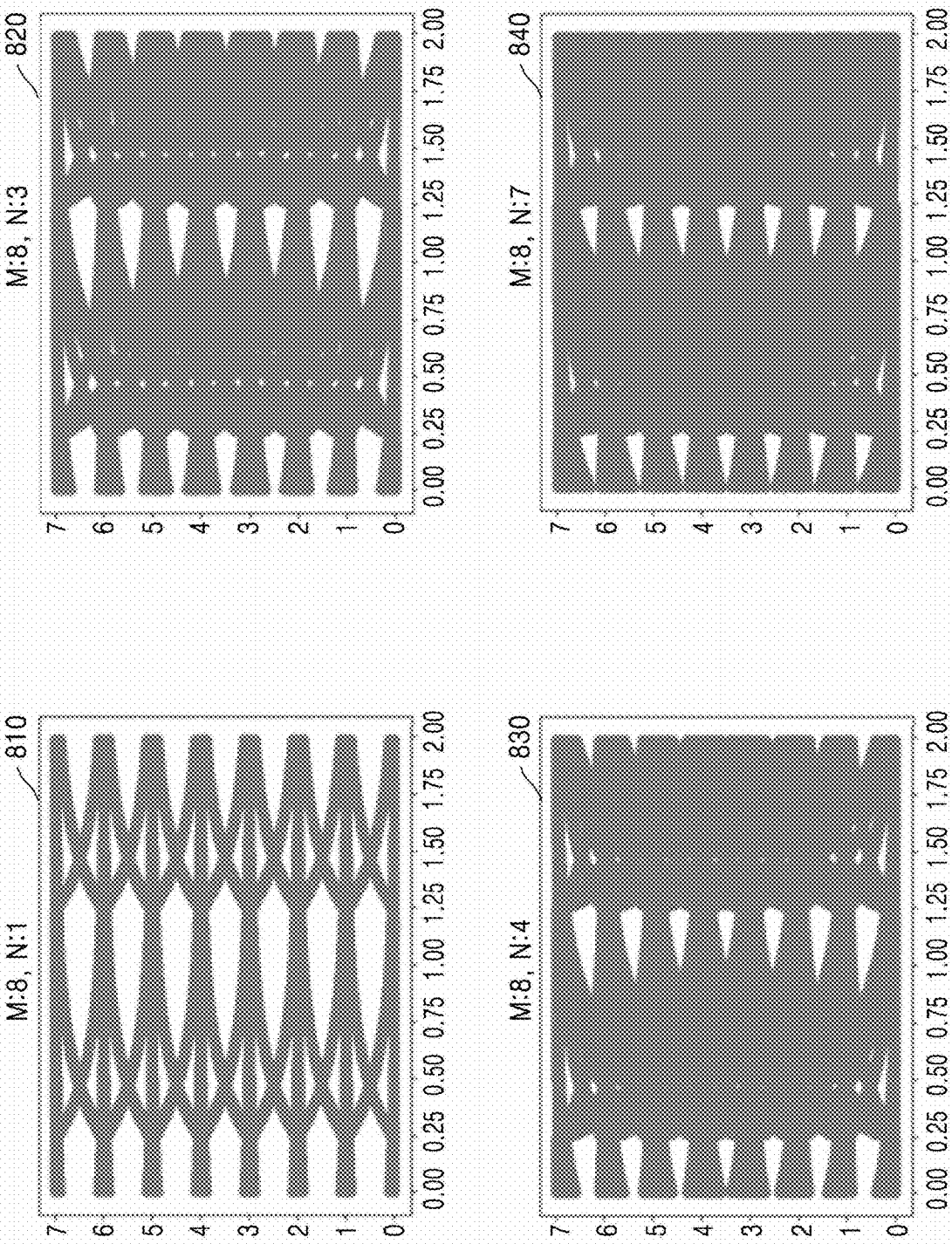
FIG. 8 is an eye-diagram in a case in which a transition level is limited in PAM-8 communication, according to an embodiment.

FIG. 8 is an eye-diagram in a case in which a transition level is limited in PAM-8 communication, according to an embodiment.

A first eye-diagram 810 of FIG. 8 shows a case in which a transition level limit is set to 1 in PAM-8 communication having a total of 8 levels. In a case in which the transition level limit is specified as 1 in PAM-8 communication, the bit error ratio is significantly low because the eye-opening is significantly large. However, in this case, there is an issue that the data rate becomes significantly low.

A second eye-diagram 820 of FIG. 8 shows a case in which a transition level limit is set to 3 in PAM-8 communication having a total of 8 levels. In a case in which the transition level is limited to 3 in PAM-8 communication, a practical communication environment with relatively large eye-opening and significantly little bit error ratio may be provided.

A third eye-diagram 830 of FIG. 8 shows a case in which a transition level limit is set to 4 in PAM-8 communication having a total of 8 levels. In a case in which the transition level is limited to 4 in PAM-8 communication, a practical communication environment with relatively large eye-opening and significantly little bit error ratio may be provided.

A fourth eye-diagram 840 of FIG. 8 shows a case in which a transition level limit is set to 7 in PAM-8 communication having a total of 8 levels. Specifying the transition level limit as 7 in PAM-8 communication corresponds to a case in which there is substantially no transition level limit, and the bit error ratio may become significantly high depending on the channel environment.

Figure 9:
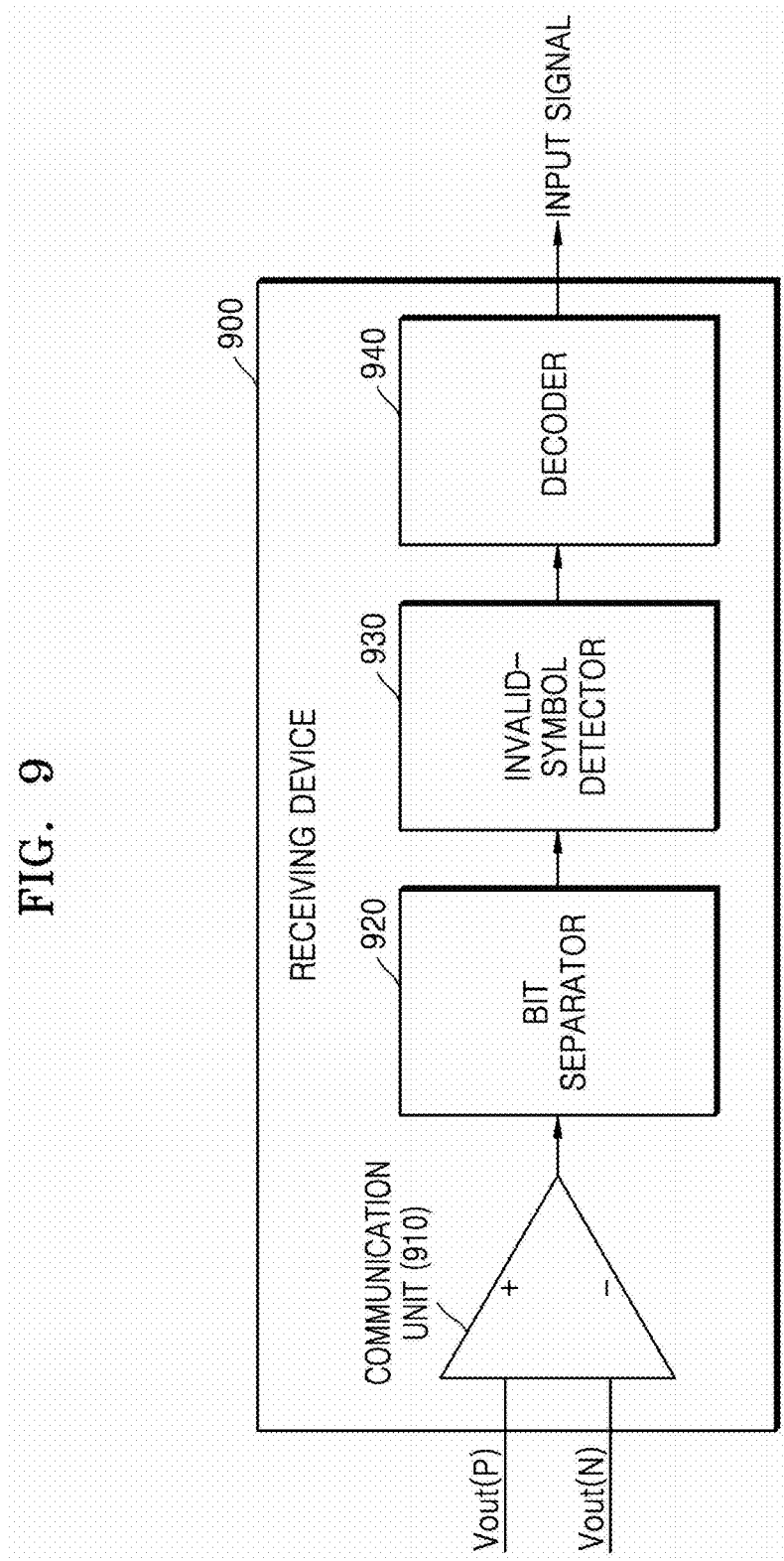
FIG. 9 is a block diagram illustrating a receiving device according to an embodiment.

FIG. 9 is a block diagram illustrating a receiving device 900 according to an embodiment.

Referring to FIG. 9, the receiving device 900 may include a communication unit 910, a bit separator 920, an invalid-symbol detector 930, and a decoder 940. In this case, the communication unit 910, the bit separator 920, the invalid-symbol detector 930, and the decoder 940 may be modules included in respective programs to be executed by different processors or one processor. According to various embodiments, each component may be omitted or modified. The receiving device 900 may correspond to the receiver 130 in the high-speed interconnect system 100 described above with reference to FIG. 1.

According to various embodiments, the communication unit 910 may receive data transmitted from a transmitting device. For example, the communication unit 910 may support establishment of a direct (e.g., wired) communication channel or a wireless communication channel between external electronic devices supporting PAM communication, and communication through the established communication channel.

The bit separator 920 according to an embodiment may separate symbols included in an input signal into a first bit, a second bit, and an n-th bit sequentially from the highest level, based on a specified criterion. The bit separator 920 may separate the first bit as an MSB, and separate the second bit and the n-th bit as a first LSB and an n−1st LSB, respectively.

The invalid-symbol detector 930 according to various embodiments may identify, for example, a symbol of an input signal exceeding a specified transition level. The transition level may be specified by a user or a system, based on the state of a channel.

For example, in PAM-4, the transition level may be specified as a value of 3 or less, and in PAM-8, the transition level may be specified as a value of 7 or less. Hereinafter, an example will be described in which the transition level is specified as 2 in PAM-4 and the transition level is specified as 5 in PAM-8.

The invalid-symbol detector 930 according to various embodiments may sequentially compare an (i−1)-th symbol with an i-th symbol, and check whether the i-th symbol exceeds the transition level. For example, when the difference between the (i−1)-th symbol and the i-th symbol in PAM-4 is '3', the invalid-symbol detector 930 may determines that the i-th symbol exceeds the specified transition level ('2'). As another example, when the difference between the (i−1)-th symbol and the i-th symbol in PAM-8 is '6' or '7', the invalid-symbol detector 930 may determines that the i-th symbol exceeds the specified transition level ('5').

After comparing the (i−1)-th symbol with the i-th symbol, the invalid-symbol detector 930 according to various embodiments may invert the MSB of the i-th symbol and again compare the i-th symbol with the (i−1)-th symbol.

For example, in PAM-4, when the (i−1)-th symbol is '0' and the i-th symbol is '1', the invalid-symbol detector 930 having determined that the transition level is not exceeded may invert the MSB of the i-th symbol. The value of the i-th symbol whose MSB is inverted may be '3', and the invalid-symbol detector 930 may determine that the i-th symbol exceeds the specified transition level ('2').

When a symbol exceeding the transition level is detected, the decoder 940 according to various embodiments may restore the input data based on data registered in the frame buffer.

For example, when a symbol exceeding the transition level is detected, the decoder 940 may extract at least one bit registered in the frame buffer, and restore the corresponding symbol based on the extracted at least one bit. For example, based on determining that the i-th symbol exceeds the specified transition level, the decoder 940 may restore the MSB of the i-th symbol based on the bit registered in the frame buffer.

For example, when the i-th symbol exceeds the specified transition level and '0' is registered in the frame buffer, the decoder 940 may restore the MSB of the i-th symbol, as '0'. As another example, when the i-th symbol exceeds the specified transition level and '1' is registered in the frame buffer, the decoder 940 may restore the MSB of the i-th symbol, as '1'.

Figure 10:
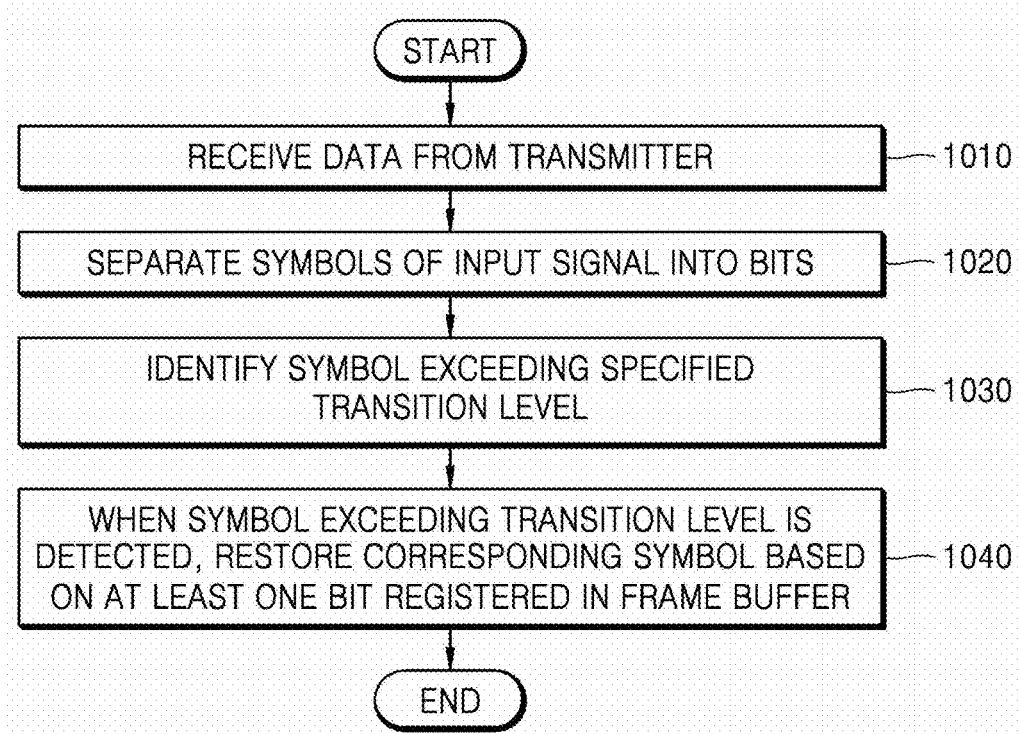
FIG. 10 is a flowchart illustrating a method, performed by a receiving device, of limiting a transition level and receiving data, according to an embodiment.

FIG. 10 is a flowchart illustrating a method, performed by a receiving device, of limiting a transition level and receiving data, according to an embodiment.

Referring to FIG. 10, in operation 1010, the receiving device may receive data from a transmitting device. The receiving device according to an embodiment may receive, from the transmitting device, data in which a frame buffer and encoded input data are combined with each other.

In operation 1020, the receiving device may separate symbols of the input signal into bits. For example, the receiving device may separate the symbols included in the input signal into a first bit, a second bit, and an n-th bit, sequentially from the highest level based on a predetermined criterion. For example, the receiving device may separate the first bit as an MSB, and separate the second bit and the n-th bit as a first LSB and an n−1st LSB, respectively.

In operation 1030, the receiving device may identify a symbol exceeding a specified transition level, from among the symbols of the input signal. For example, the receiving device may sequentially compare an (i−1)-th symbol with an i-th symbol, and check whether the i-th symbol exceeds the transition level. After comparing the (i−1)-th symbol with the i-th symbol, the receiving device according to an embodiment may invert the MSB of the i-th symbol and again compare the i-th symbol with the (i−1)-th symbol.

In operation 1040, when a symbol exceeding the transition level is detected, the receiving device may restore the input data based on data registered in the frame buffer. For example, when a symbol exceeding the transition level is detected, the receiving device may extract at least one bit registered in the frame buffer, and restore the corresponding symbol. For example, based on determining that the i-th symbol exceeds the specified transition level, the receiving device may restore the MSB of the i-th symbol based on the bit registered in the frame buffer.

Configurations and operating principles of a PAM transmitter and receiver according to an embodiment have been described in detail with reference to the drawings.

The PAM transmitter and receiver according to an embodiment have an effect of providing PAM communication with a high data rate and a low data error rate, and are able to adaptively set a limit level without applying an additional digital circuit.

The device described above may be implemented as a hardware component, a software component, and/or a combination of a hardware component and a software component. For example, the devices and components described in the embodiments may be implemented by using one or more general-purpose computers or special-purpose computers, such as a processor, a controller, an arithmetic logic unit (ALU), a digital signal processor, a microcomputer, a field-programmable gate array (FPGA), a programmable logic unit (PLU), a microprocessor, or any other device configured to execute and respond to instructions. The processor may execute an operating system (OS) and one or more software applications running on the OS. The processor may also access, store, modify, process, and generate information in response to execution of software. Although some embodiments are described, for convenience of understanding, with reference to examples in which a single processor is used, those of skill in the art would understand that a processor may include a plurality of processing elements and/or a plurality of types of processing elements. For example, the processor may include one or more processors and one controller. In addition, other processing configurations are also possible, such as a parallel processor.

The software may include a computer program, code, instructions, or a combination of one or more thereof, and may configure the processor to operate as desired or may independently or collectively instruct the processor. Software and/or information may be embodied permanently or temporarily in any type of machine, component, physical or virtual equipment, computer storage medium, or device, for providing instructions or information to or being interpreted by the processor. Software may be distributed on networked computer systems and stored or executed in a distributed manner. The software and information may be stored in one or more computer-readable recording media.

The method according to an embodiment may be embodied as program commands executable by various computer devices, and recorded on a computer-readable medium. Examples of the computer-readable recording medium include magnetic media such as hard disks, floppy disks, or magnetic tapes, optical media such as compact disc ROMs (CD-ROMs) or digital video discs (DVDs), magneto-optical media such as floptical disks, and hardware devices such as ROM, RAM, and flash memory, which are specially configured to store and execute program instructions. Examples of the program instructions include not only machine code, such as code made by a compiler, but also high-level language code that is executable by a computer by using an interpreter or the like.

Although the embodiments have been described with the limited embodiments and the drawings, various modifications and changes may be made by those of skill in the art from the above description. For example, the described techniques may be performed in a different order from the described method, and/or components of the described system, structure, device, circuit, etc. may be combined or integrated in a different form from the described method, or may be replaced or substituted by other components or equivalents to achieve appropriate results. Therefore, other implementations or embodiments, and equivalents of the following claims are within the scope of the claims.

The PAM transmitter and receiver according to an embodiment are able to perform PAM communication with a high data rate and a low data error rate, and adaptively set a limit level without applying an additional digital circuit.

Effects of the disclosure are not limited to the foregoing, and other unmentioned effects would be clearly understood by those skill in the art from the following description.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A pulse-amplitude modulation (PAM) transmitter comprising:
   a transceiver; and
   at least one processor connected to the transceiver and configured to:
   identify, from among symbols included in an input signal, a symbol that exceeds a specified transition level;
   when the symbol exceeding the transition level is identified, obtain a frame buffer comprising at least one bit among bits constituting the identified symbol;
   encode input data by inverting at least one bit among the bits constituting the identified symbol; and
   transmit the frame buffer and the encoded input data.

2. The PAM transmitter of claim 1, wherein the at least one bit among the bits constituting the identified symbol is a most significant bit (MSB).

3. The PAM transmitter of claim 1, wherein the at least one processor is further configured to identify whether an i-th symbol among the symbols included in the input signal exceeds the transition level by comparing an (i−1)-th symbol with the i-th symbol.

4. The PAM transmitter of claim 3, wherein the at least one processor is further configured to, after comparing the (i−1)-th symbol with the i-th symbol, obtain a symbol in which an MSB of the i-th symbol is inverted, and identify a difference between the symbol in which the MSB is inverted and the (i−1)-th symbol.

5. The PAM transmitter of claim 1, wherein the at least one processor is further configured to, until a transition level of a symbol generated by combining a first bit included in the frame buffer with a bit of a symbol of the input signal corresponding to the first bit included in the frame buffer does not exceed the specified transition level, fill the frame buffer with a dummy bit having a value equal to the bit included in the frame buffer.

6. The PAM transmitter of claim 4, wherein the at least one processor is further configured to, when a symbol exceeding the transition level is detected based on a result of inverting the MSB of the i-th symbol, encode the input data without inverting the at least one bit.

7. A pulse-amplitude modulation (PAM) receiver comprising:
   a transceiver; and
   at least one processor connected to the transceiver and configured to:
   receive a frame buffer and encoded input data;
   identify, from among symbols included in the encoded input data, a symbol exceeding a specified transition level; and
   when the symbol exceeding the specified transition level is identified, restore the identified symbol by inverting at least one bit among bits constituting the identified symbol based on a bit included in the frame buffer.

8. The PAM receiver of claim 7, wherein the at least one bit among the bits constituting the identified symbol is a most significant bit (MSB).

9. The PAM receiver of claim 7, wherein the at least one processor is further configured to identify whether an i-th symbol among the symbols exceeds the transition level by comparing an (i−1)-th symbol with the i-th symbol.

10. The PAM receiver of claim 8, wherein the at least one processor is further configured to, after comparing the (i−1)-th symbol with the i-th symbol, obtain a symbol in which an MSB of the i-th symbol is inverted, and identify a difference between the symbol in which the MSB is inverted and the (i−1)-th symbol.

11. A method of limiting a transition level and transmitting pulse-amplitude modulation (PAM) data, the method comprising:
   identifying, from among symbols included in an input signal, a symbol that exceeds a specified transition level;
   when the symbol exceeding the transition level is identified, obtaining a frame buffer comprising at least one bit among bits constituting the identified symbol;
   encoding input data by inverting at least one bit among the bits constituting the identified symbol; and
   transmitting the frame buffer and the encoded input data.

12. The method of claim 11, wherein the at least one bit among the bits constituting the identified symbol is a most significant bit (MSB).

13. The method of claim 11, wherein the identifying of the symbol exceeding the specified transition level comprises identifying whether an i-th symbol among the symbols included in the input signal exceeds the transition level by comparing an (i−1)-th symbol with the i-th symbol.

14. The method of claim 13, wherein the encoding of the input data comprises:
   after comparing the (i−1)-th symbol with the i-th symbol, obtaining a symbol in which an MSB of the i-th symbol is inverted; and
   identifying a difference between the symbol in which the MSB is inverted and the (i−1)-th symbol.

15. The method of claim 11, wherein the obtaining of the frame buffer comprises, until a transition level of a symbol generated by combining a first bit included in the frame buffer with a bit of a symbol of the input signal corresponding to the first bit included in the frame buffer does not exceed the specified transition level, filling the frame buffer with a dummy bit having a value equal to the bit included in the frame buffer.

16. The method of claim 14, wherein the encoding of the input data comprises, when a symbol exceeding the transition level is detected based on a result of inverting the MSB of the i-th symbol, encoding the input data without inverting the at least one bit.

17. A method of limiting a transition level and receiving pulse-amplitude modulation (PAM) data, the method comprising:
  receiving a frame buffer and encoded input data;
  identifying, from among symbols included in the encoded input data, a symbol exceeding a specified transition level; and
  when the symbol exceeding the specified transition level is identified, restoring the identified symbol by inverting at least one bit among bits constituting the identified symbol based on a bit included in the frame buffer.

18. The method of claim 17, wherein the at least one bit among the bits constituting the identified symbol is a most significant bit (MSB).

19. The method of claim 17, wherein the identifying of the symbol exceeding the specified transition level comprises identifying whether an i-th symbol among the symbols exceeds the transition level by comparing an (i−1)-th symbol with the i-th symbol.

20. The method of claim 18, wherein the restoring of the identified symbol comprises:
  after comparing the (i−1)-th symbol with the i-th symbol, obtaining a symbol in which an MSB of the i-th symbol is inverted; and
  identifying a difference between the symbol in which the MSB is inverted and the (i−1)-th symbol.

* * * * *